R. E. DE CAMP.
CONTROL SYSTEM AND SWITCH MECHANISM THEREFOR.
APPLICATION FILED NOV. 16, 1918.

1,421,179.

Patented June 27, 1922.
2 SHEETS—SHEET 1.

WITNESSES:
H. B. Funk
David Rines

INVENTOR
Ray E. De Camp.
BY
Wesley G. Carr
ATTORNEY

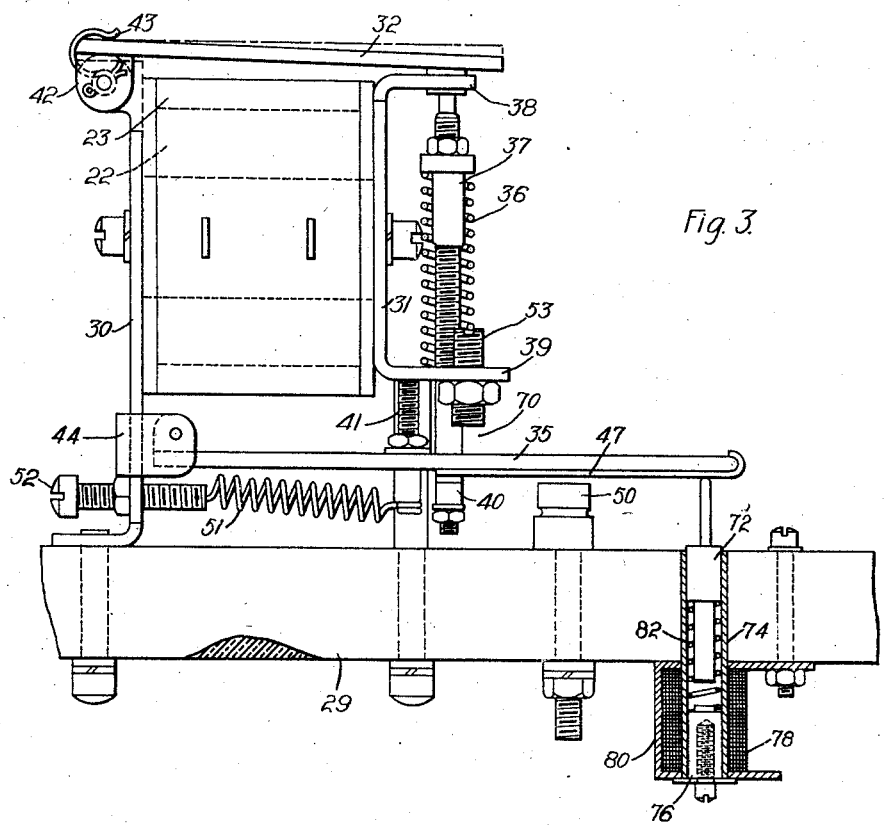
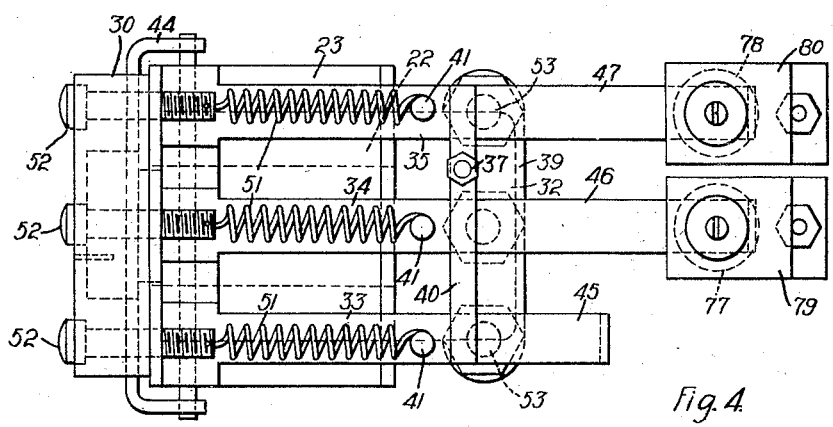

UNITED STATES PATENT OFFICE.

RAY E. DE CAMP, OF WILKINSBURG, PENNSYLVANIA, ASSIGNOR TO WESTINGHOUSE ELECTRIC & MANUFACTURING COMPANY, A CORPORATION OF PENNSYLVANIA.

CONTROL SYSTEM AND SWITCH MECHANISM THEREFOR.

1,421,179. Specification of Letters Patent. Patented June 27, 1922.

Application filed November 16, 1918. Serial No. 262,807.

*To all whom it may concern:*

Be it known that I, RAY E. DE CAMP, a citizen of the United States, and a resident of Wilkinsburg, in the county of Allegheny and State of Pennsylvania, have invented a new and useful Improvement in Control Systems and Switch Mechanisms Therefor, of which the following is a specification.

My invention relates to systems of control of general application, but more particularly to systems for controlling electric motors such, for example, as motor-accelerating systems involving main switches or contactors designed to close in succession to shunt a resistor.

In systems of the character above designated, each contactor is customarily provided with an auxiliary switch or a relay for governing the closing of the contactor and, in order to avoid injuring the motor by excessive current, each contactor is adapted to close before the relay for controlling the next succeeding contactor can operate.

In a copending application by H. D. James, Serial No. 236,937, filed May 27, 1918, patented Sept. 27, 1921, Pat. No. 1,392,056, and assigned to the Westinghouse Electric & Manufacturing Company, is disclosed a motor-control system in which the relays for closing the contactors are controlled by a coil in parallel circuit with the accelerating resistor. The relays and contactors are electrically interlocked in such fashion as to insure the proper sequence of acceleration and deceleration when the master controller is moved backwardly and forwardly, or after a failure of voltage and the return of power to the line. This result is effected by introducing energizing coils in series with various of the contactor coils, these energizing coils serving to close the relays which control the next succeeding contactors.

An object of my invention is to provide an improved interlocked system of the above-described character.

A further object is to provide an improved relay structure for use in connection with my system.

According to my invention, the above-referred-to additional coils, which are in series with various of the contactor coils, instead of positively effecting the closing of the relays which they control, operate to remove spring-pressed locking plungers from engagement with those relays, thereby permitting the closing of the relays in accordance with circuit conditions.

Figure 1:
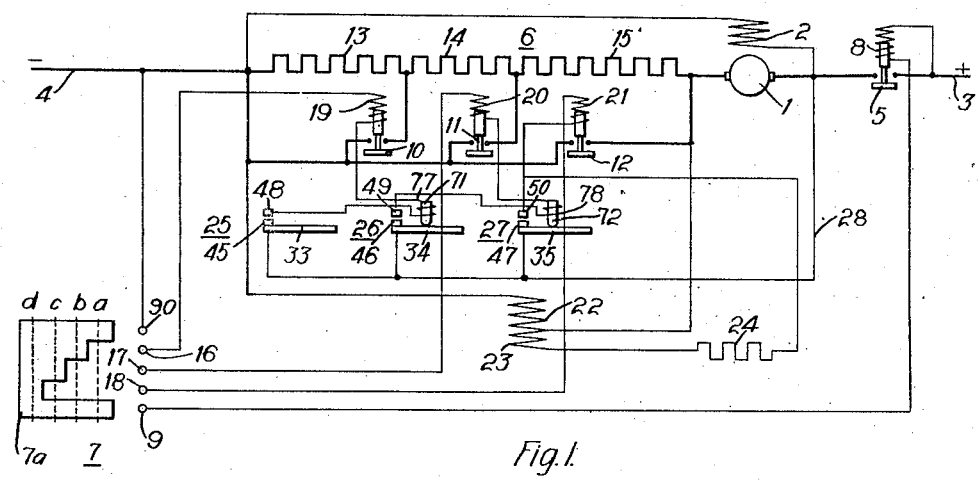
Figure 2:
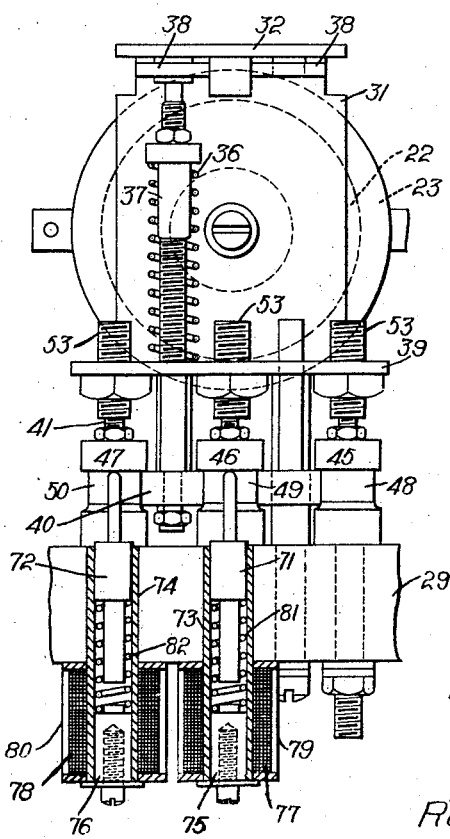

For a better understanding of my invention, reference may be had to the accompanying drawings in which Fig. 1 is a diagrammatic view of a system arranged according to my invention. Figs. 2 and 3 are, respectively, a front and a side elevation, partly in section, of my improved relay mechanism, and Fig. 4 is a bottom plan view of the relay mechanism, the panel being omitted for clearness.

Referring first to Fig. 1, a motor, the armature of which is shown at 1 and a shunt field-magnet winding at 2, is connected between line conductors 3 and 4, separated by a line contactor 5, with a regulating resistor 6 normally in series with the armature 1. A master controller 7 controls the closing of the contactor 5, through the action of an energizing coil 8, by engagement of its movable contact member $7^a$ with stationary contact members 9 and 90. One or more contactors 10, 11 and 12 (three are illustrated) control the shunting of successive portions 13, 14 and 15 of the regulating resistor 6 through the medium of energizing coils 19, 20 and 21, which energization is effected by engagement of the master-controller contact member $7^a$ with contact members 16, 17, 18 and 90.

A coil 22 is connected in parallel circuit with the resistor 6, and a second coil 23 is connected, as below described, in circuit with a high resistance 24 which may be embodied in the coil itself, if desired. The energizing of the coil 22, as explained below, permits the successive closing of the relays 25, 26 and 27, in accordance with the strength of the current passing through the coil 22. The coil 19, the relay 25 and a coil 77 are series-connected in a circuit extending from the line conductor 3, through the contactor 5, a conductor 28, and the contact members 16, $7^a$ and 90, to the line conductor 4. The coil 20, the relay 26 and a coil 78, as also the coil 21 and the relay 27, are in parallel relation to the coil 19, the relay 25 and the coil 77, their circuits respectively including the contact members 17 and 18. The relay 27, besides performing functions similar to those of the relays 25 and 26, serves also to close the circuit of the coil 23.

Referring now to Figs. 2, 3 and 4, an insulating panel 29 carries two brackets 30 and 31 supporting the coils 22 and 23 which, when energized by current flowing through them, produce magnetic fields for attracting an armature 32 and any desired number of additional armatures 33, 34 and 35. A compression spring 36 is adjustably mounted upon a non-magnetizable rod 37 slidably mounted in arms 38 and 39 which are rigidly connected to, or constitute integral parts of, the bracket 31. The projection 38 serves also as a pole piece for the armature 32, and the projection 39 as a pole piece for the armatures 33, 34 and 35. A bar 40 is rigidly connected to the rod 37 and normally engages the armatures 33, 34 and 35. The spring 36 thus normally maintains the armatures 33, 34 and 35 in their open positions, with the members 41, which are carried by these armatures, in contact with the pole piece 39. The members 40 and 41 are preferably composed of non-magnetizable material to prevent "freezing."

The armature 32 is provided with ears or lugs 42, which are pivotally mounted upon the bracket 30, and is normally maintained in contact with one end of the rod 37 by a weak spring 43. The bracket 30 supports a non-magnetizable, U-shaped member 44 between the arms of which are pivotally mounted the armatures 33, 34 and 35 which carry, respectively, the movable contact members 45, 46 and 47 of the relays 25, 26 and 27. The corresponding stationary contact members 48, 49 and 50 are mounted upon the insulating panel 29.

Springs 51 are attached to longitudinally adjustable members 52 and to the other ends of the members 41. The pole piece 39 is provided with longitudinally adjustable members 53 to regulate air gaps 70 between these members and the corresponding armatures. By means of this adjustment or by means of the members 52, which control the tension of the springs 51, the action of the magnetic flux produced by the coil 22 may be so regulated that the armatures 33, 34 and 35 will be operated in proper sequence.

Plungers 71 and 72, which are adapted to reciprocate within non-magnetizable tubes 73 and 74 towards pole pieces 75 and 76, are forced by springs 81 and 82 into engagement with the armatures 34 and 35, thus aiding the spring 36 in maintaining these armatures open. The pole pieces 75 and 76 are energized by the coils 77 and 78, which serve also to actuate the locking plungers 71 and 72 into engagement with these pole pieces, thereby to permit the closing of the armatures 34 and 35 in proper sequence, in accordance with circuit conditions, as described below.

The operation is as follows: upon the actuation of the master controller 7 to the position $a$, the coil 8 is energized to close the line contactor 5, which completes the motor circuit. Current then flows through the armature 1 and the resistor 6 and also through the shunt field-magnet winding 2, as well as through the shunt coil 22. Energization of the coil 22 produces a magnetic field which attracts the armature 32 to the pole piece 38, the movement of the armature 32 being from the broken to the full-line position of Fig. 3. The rod 37 is thereupon pressed inwardly, in opposition to the force of the spring 36, forcing the bar 40 away from the armatures 33, 34 and 35. If the current is above a previously selected safe value, the flux of the magnetic field will overcome the forces of the springs 51, and the armatures will remain with the stops 41 in engagement with the pole piece 39. As the motor accelerates, and the current begins to die down, the magnetic flux set up by the coil 22 becomes weakened. After a time, when the flux has decreased to a predetermined value, that spring 51 which is attached to the armature 33, will overcome the flux of this field so as to close the relay 25. The time when this operation occurs depends upon the air gaps 70 and the tension of this spring 51. The relays 26 and 27, however, remain open.

Upon movement of the controller 7 to the position $b$, a circuit will be closed from the line conductor 3, through the contactor 5, the conductor 28, the relay 25, the coils 77 and 19 and the contact members 16, 7$^a$ and 90, to the line conductor 4. The coil 19, thus becoming energized, causes the closing of the contactor 10 which, in turn, creates a shunt circuit for the portion 13 of the resistor 6. The energization of the coil 77 removes the locking plunger 71, in opposition to the force of the spring 81, from engagement with the armature 34. The relay 26 does not yet close, however, because the force of the spring 51, which is attached to this armature, is not great enough to overcome the flux of the field produced by the coil 22. The motor then further accelerates to decrease the voltage across the terminals of the coil 22 and thus weaken the magnetic field in the neighborhood of this coil, whereupon the relay 26 will be closed by its spring 51. A circuit is then made, if the master controller be actuated to the position $c$, from the line conductor 3 through the contactor 5, the conductor 28, the relay 26, the coils 78 and 20 and the contact members 17, 7$^a$ and 90, to the line conductor 4. The coil 20, thus becoming energized, causes the closing of the contactor 11 and the consequent shunting of the resistor 14. The energizing of the coil 78 releases the armature 72 mechanically, but magnetically this armature is held in engagement with the pole piece 39 by the magnetic field produced by the coil 22. After the motor has further accelerated, the relay 27 will be closed by its spring 51 as soon as the magnetism in the coil 22 becomes low enough to permit this closing. A circuit is then established, assuming the master controller 7 to occupy the position $d$, from the line conductor 3, through the contactor 5, the conductor 28, the relay 27, the coil 21 and the contact members 18, 7ª and 90, to the line conductor 4, thereby causing the energization of the coil 21 and the closing of the contactor 12. The resistor 6 is then entirely shunted from the armature circuit, and the armature 1 is connected directly across the line.

The shunting of the entire resistor 6 de-energizes the coil 22 and tends to release the armature 32 and open the relays 25, 26 and 27. This is prevented by the coil 23, the circuit of which, extending from the line conductor 3, through the contactor 5, the conductor 28, the relay 27, the resistor 24 and the coil 23, to the other side of the armature 1, is closed by the relay 27. So long as this relay 27 remains closed, the coil 23 will be sufficiently energized to maintain the armature 32 in the full-line position of Fig. 3.

The above description supposes the master controller 7 to be actuated step by step to the positions $a$, $b$, $c$ and $d$. It will be obvious that the controller 7 may be actuated to the final position $d$ in a single step, whereupon the above-described operations will take place automatically in sequence.

Supposing, now, the motor to have attained high speed, let us suppose the master controller 7 to be actuated to any of the positions $a$, $b$ and $c$,—for example, to the position $a$. The coils 19, 20, 21, 77 and 78 will become de-energized and the contactors 10, 11 and 12 and the relays 26 and 27 will, consequently, fly open. The circuit of the coil 23 will thereby become broken, but the armature 32 will be maintained in the closed position by the coil 22 which, being in parallel circuit with the resistor 6, will become energized as soon as current begins to flow through any portion of the resistor. Upon again actuating the controller 7 to the position $d$, the coil 19 will become energized to cause the closing of the contactor 10. The coil 77, becoming energized simultaneously with the energization of the coil 19, will operate as before to permit the closing of the armature 34 of the relay 26 when the magnetism in the coil 22 is low enough to permit this closing. Not until the relay 26 has closed, however, can the circuit of the coil 20 be closed to cause the actuation of the contactor 11. The simultaneous closing of the contactors 10 and 11 is thereby avoided, the interval of time between the closing of the two contactors being determined by the conditions of the motor circuit, as above described. Similarly, the contactor 12 cannot be closed until the coil 21 is energized and this cannot happen until the relay 27 is closed which, in turn, must await the energization of the coil 20 and, simultaneously therewith, that of the coil 78.

The danger of suddenly throwing the armature 1 into the line circuit without any resistance in series with it upon the actuation of the controller 7 to the first or any intermediate position and its immediate re-actuation to final position, which is often desirable, is thus avoided. A similar effect is obviously obtained when, after a failure of line voltage, energy is again supplied to the motor. The possibility of injury to the motor windings, due to excessive current, is thus removed.

Although I have illustrated and described a specific form of attaining this result, it will be understood that I am not to be limited to the exact connections described, but that my invention is commensurate with the breadth of the appended claims.

I claim as my invention:

1. The combination with an electric circuit and a plurality of switches, of a normally open relay for controlling one of said switches, means for normally preventing the closing of said relay, a coil in said circuit for overpowering said preventing means, and means for de-energizing said coil when another of said switches is opened.

2. The combination with a plurality of switches and a coil for actuating one of them, of a relay for controlling another of said switches, means for opening said relay, a coil in circuit with said switch coil for rendering said opening means ineffective, and means for de-energizing said relay coil to permit said opening means to open said relay when another of said switches is opened.

3. The combination with an electric motor having a resistor, a plurality of switches for short-circuiting said resistor, each having an actuating coil, and a plurality of relays adapted to close to energize said coils, of means for maintaining said relays open, and a plurality of actuating coils each of which is adapted to render one of said maintaining means ineffective and each in circuit with one of said switch coils.

4. The combination with an electric motor having a resistor, of a pair of switches for controlling the short-circuiting of said resistor, means tending to close one of said switches, means tending to open said other switch, an energizing coil in parallel circuit with said resistor for maintaining said switches open, and an energizing coil for rendering said opening means ineffective.

5. The combination with an electric motor having a resistor, of a pair of switches for short-circuiting said resistor and each having an actuating coil, a pair of relays adapted to close to energize said coils, means dependent upon the voltage of said resistor for delaying the closing of said relays, means for preventing the closing of one of said relays when one of said switches is open, and an actuating coil in series with the coil of said one switch for rendering said preventing means inoperative when said one switch is closed.

6. The combination with an electric motor having a resistor, of a pair of switches for short-circuiting said resistor each of which has an actuating coil, a pair of relays adapted to close to energize said coils, means for preventing the closing of one of said relays, a coil in series with the coil of one of said switches adapted to be energized to render said preventing means inoperative, an energizing coil in parallel circuit with said resistor for delaying the closing of said relays, and means for maintaining said relays closed after said resistor becomes short-circuited.

In testimony whereof, I have hereunto subscribed my name this 28th day of Oct. 1918.

RAY E. DE CAMP.